(No Model.)

S. E. SMITH.
COMBINED SINKER AND FISH HOOK HOLDER.

No. 252,628. Patented Jan. 24, 1882.

WITNESSES:
Jerome Howell
D. Meisner

INVENTOR:
Sylvester E. Smith
per.
Chas. F. Meisner.
ATTY.

UNITED STATES PATENT OFFICE.

SYLVESTER E. SMITH, OF ST. LOUIS, MISSOURI.

COMBINED SINKER AND FISH-HOOK HOLDER.

SPECIFICATION forming part of Letters Patent No. 252,628, dated January 24, 1882.

Application filed April 15, 1881. (No model.)

*To all whom it may concern:*

Be it known that I, SYLVESTER E. SMITH, of St. Louis, Missouri, have invented a new and useful Improved Sinker and Fish-Hook Holder combined, of which the following is a specification.

The first part of my invention relates to a mode of securing the fish-hook in the holder. In this the shank of the hook is inserted in a tubular recess in the holder, one side of said recess being formed by a cam or eccentric which, when turned, firmly gripes and holds the hook-shank in the holder.

The second part of my invention relates to forming the holder or sinker of a fish shape, so that it will form an attraction for the fish, and at the same time answer both as a sinker and holder for the fish-hook.

The third part of my invention consists in attaching the fishing-line to the center of the holder, so that the holder in use will assume a horizontal position, and thereby present the hook in a similar horizontal position.

To more clearly describe my said invention, reference is made to the accompanying drawings, in which—

Figure 1:
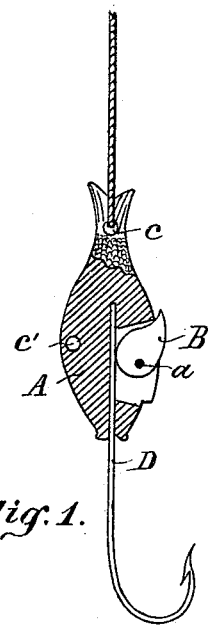
Figure 2:
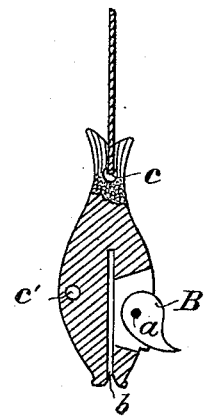

Figure 1 is a side view, partly in section, of the holder or sinker with the parts in engagement. Fig. 2 is a similar view with the parts disengaged, the cam being shown thrown back; and Fig. 3 is a side view, showing the holder or sinker with the hook suspended in a horizontal position.

The holder or sinker A is cast or formed of metal, so as to resemble a fish, and in the body of the same, at *a*, is pivoted a cam, B, as indicated in Figs. 1 and 2. At the mouth of the fish-shaped sinker or holder is formed a tubular recess, *b*, one side of which is formed by the cam B, as shown. The recess *b* is formed large enough to receive the shank of any required size of fish-hooks, whether provided with eyes or not. The shank of the fish-hook D is griped and held in place by pressing the cam B around until it engages the side of the hook-shank, in which position the cam will be held automatically by the reacting pressure of the hook falling beyond or against the pivot-point *a*.

*c* is an eye at the tail end of the sinker or holder, in which may be inserted, if desired, the fishing-line, so as to have the holder and hook hang vertically.

Figure 3:
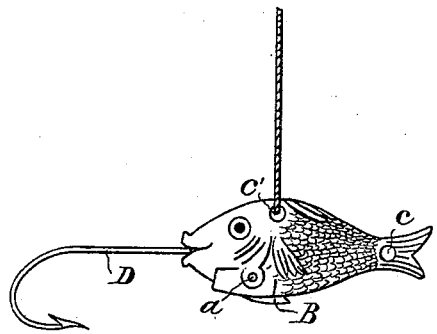

In order to present the hook in a horizontal position to the fish, the line will be attached to an eye, *c'*, located at the center of gravity of the sinker or holder, as clearly indicated in Fig. 3.

The operation of my improvement is as follows: The cam B being thrown out, as shown in Fig. 2, the hook-shank is passed into the recess B to the full depth of the same, passing behind the cam, which, when pressed around, engages the hook-shank and firmly holds it in position, as shown in Fig. 1.

It will be readily seen with my improved construction that any required size of hook can be readily fitted to and firmly held in place in the holder, and also that the hook can be readily removed and replaced by a different one when desired.

I am aware that prior to my invention artificial bait and also trolling-baits have been formed of a fish shape, and I therefore do not claim such construction, broadly; but What I do claim as my invention, and desire to secure by Letters Patent, is—

1. A sinker for fishing-lines, formed in imitation of a fish and provided with a holding device for the fish-hook, as described, and for the purpose set forth.

2. A fish-hook holder formed with a tubular recess, *b*, in combination with the cam B, all arranged as herein described, and for the purpose set forth.

3. A sinker for fishing-lines, provided with a device for holding the fish-hook and an eye, *c'*, located as described, for the attachment of the line, as described, and for the purpose set forth.

In testimony of said invention I have hereunto set my hand.

SYLVESTER E. SMITH.

Witnesses:
 CHAS. F. MEISNER,
 DORA MEISNER.